United States Patent
Ganesan

(10) Patent No.: US 10,587,683 B1
(45) Date of Patent: *Mar. 10, 2020

(54) PROXIMITY IN PRIVACY AND SECURITY ENHANCED INTERNET GEOLOCATION

(71) Applicant: Early Warning Services, LLC, Scottsdale, AZ (US)

(72) Inventor: Ravi Ganesan, West Palm Beach, FL (US)

(73) Assignee: EARLY WARNING SERVICES, LLC, Scottsdale, AZ (US)

(*) Notice: Subject to any disclaimer, the term of this patent is extended or adjusted under 35 U.S.C. 154(b) by 886 days.

This patent is subject to a terminal disclaimer.

(21) Appl. No.: 13/736,944

(22) Filed: Jan. 9, 2013

Related U.S. Application Data

(63) Continuation-in-part of application No. 13/669,123, filed on Nov. 5, 2012, now Pat. No. 8,589,459.

(51) Int. Cl.
*H04L 29/08* (2006.01)

(52) U.S. Cl.
CPC .......... *H04L 67/104* (2013.01); *H04L 67/04* (2013.01); *H04L 67/22* (2013.01); *H04L 67/26* (2013.01)

(58) Field of Classification Search
CPC ....... H04L 69/28; H04L 67/104; H04L 67/04; H04L 67/22; H04L 67/26; H04W 24/06; H04W 24/29; H04W 24/38; H04W 12/06; H04W 12/29; H04W 12/38
USPC ................................. 709/208, 224, 233, 245
See application file for complete search history.

(56) References Cited

U.S. PATENT DOCUMENTS

| | | | |
|---|---|---|---|
| 5,874,918 A | 2/1999 | Czarnecki et al. | |
| 5,930,474 A | 7/1999 | Dunworth et al. | |
| 6,151,631 A | 11/2000 | Ansell et al. | |
| 6,249,252 B1 | 6/2001 | Dupray | |
| 6,684,250 B2 | 1/2004 | Anderson et al. | |
| 6,757,740 B1* | 6/2004 | Parekh | G06Q 20/3224 709/245 |
| 6,769,030 B1* | 7/2004 | Bournas | H04L 29/06 370/231 |

(Continued)

OTHER PUBLICATIONS

Non-Final Office Action dated Sep. 20, 2018 in related U.S. Appl. No. 15/422,137, all pages.

(Continued)

*Primary Examiner* — James N Fiorillo
(74) *Attorney, Agent, or Firm* — Kilpatrick Townsend & Stockton LLP

(57) ABSTRACT

The present innovation extends the innovations inherent in our prior work on security and privacy enhanced geolocation to address specific problems of determining the proximity of two Internet connected devices. This could be used for applications such as determining proximity of a user's smartphone to an ATM machine they are using. Or to determine the physical proximity of a shopper and a cashier at a check out line. A straightforward application of the prior work will not suffice, as devices may have very different types of connectivity to the Internet. We solve this problem by placing reciprocal slave servers on each of the devices and giving high weight to the time taken for messages to travel from each device to the slave on the other device. The system can be extended to more than two entities by performing the calculation in a pairwise fashion and using further optimizations.

7 Claims, 1 Drawing Sheet

The components for the preferred embodiment

(56) References Cited

U.S. PATENT DOCUMENTS

| | | | |
|---|---|---|---|
| 6,947,978 B2 | 9/2005 | Huffman et al. | |
| 6,968,194 B2* | 11/2005 | Aljadeff | G01S 5/06 342/450 |
| 7,100,204 B1 | 8/2006 | Myllymaki et al. | |
| 7,194,354 B1 | 3/2007 | Oran et al. | |
| 7,657,522 B1* | 2/2010 | Puzicha | G06F 16/951 707/723 |
| 8,341,236 B1 | 12/2012 | Ganesan | |
| 8,364,758 B2* | 1/2013 | Hydrie | H04L 67/104 370/228 |
| 8,589,459 B1 | 11/2013 | Ganesan | |
| 8,589,532 B2* | 11/2013 | Tenny | G01S 5/0242 709/223 |
| 2002/0069037 A1* | 6/2002 | Hendrickson | H04L 41/12 702/186 |
| 2003/0046022 A1* | 3/2003 | Silverman | 702/150 |
| 2003/0092421 A1* | 5/2003 | Dolwin | H04L 29/06027 455/403 |
| 2003/0093341 A1* | 5/2003 | Millard | G06Q 30/04 705/34 |
| 2003/0157963 A1* | 8/2003 | Collot | 455/557 |
| 2005/0018611 A1* | 1/2005 | Chan | H04L 41/147 370/241 |
| 2005/0071417 A1 | 3/2005 | Taylor et al. | |
| 2006/0239199 A1* | 10/2006 | Blair | H04L 45/04 370/248 |
| 2007/0011312 A1* | 1/2007 | Nakamura | H04W 24/00 709/224 |
| 2007/0167171 A1 | 7/2007 | Bishop | |
| 2007/0250920 A1 | 10/2007 | Lindsay | |
| 2007/0300070 A1* | 12/2007 | Shen-Orr | G06F 21/33 713/176 |
| 2008/0037536 A1* | 2/2008 | Padmanabhan | H04L 45/04 370/389 |
| 2008/0137554 A1 | 6/2008 | Nandhra | |
| 2008/0167106 A1* | 7/2008 | Lutnick | G07F 17/32 463/16 |
| 2008/0182598 A1* | 7/2008 | Bowman | G01C 21/26 455/466 |
| 2009/0222581 A1* | 9/2009 | Josefsberg et al. | 709/245 |
| 2009/0235339 A1 | 9/2009 | Mennes et al. | |
| 2009/0265776 A1 | 10/2009 | Baentsch et al. | |
| 2010/0131670 A1* | 5/2010 | Ishii | H04L 47/10 709/233 |
| 2010/0153540 A1 | 6/2010 | Li et al. | |
| 2010/0242104 A1 | 9/2010 | Wankmueller et al. | |
| 2010/0325427 A1* | 12/2010 | Ekberg | H04L 9/321 713/156 |
| 2010/0329125 A1* | 12/2010 | Roberts | H04J 3/0667 370/241.1 |
| 2011/0206039 A1* | 8/2011 | Lee | G01S 5/0027 370/352 |
| 2011/0231354 A1* | 9/2011 | O'Sullivan | G08G 1/0104 706/46 |
| 2012/0166598 A1* | 6/2012 | Yuan | H04L 41/12 709/220 |
| 2013/0133086 A1 | 5/2013 | Liberman et al. | |
| 2013/0196685 A1* | 8/2013 | Griff | H04L 43/067 455/456.1 |
| 2013/0333006 A1 | 12/2013 | Tapling et al. | |
| 2014/0020073 A1 | 1/2014 | Ronda et al. | |
| 2015/0156267 A1 | 6/2015 | Zhang | |
| 2015/0254672 A1 | 9/2015 | Huesch et al. | |
| 2016/0036777 A1 | 2/2016 | Bartlett | |
| 2016/0148597 A1 | 5/2016 | Hamid et al. | |
| 2016/0316341 A1* | 10/2016 | Vaccari | H04W 4/029 |
| 2017/0085635 A1 | 3/2017 | Nicholls | |
| 2017/0123069 A1* | 5/2017 | Kotab | G01S 19/13 |
| 2017/0289172 A1 | 10/2017 | Turakhia | |

OTHER PUBLICATIONS

Geolocation Software; http://en.wikipedia.org/wiki/Geolocation_software; all pages.

Padmanabhan et al; "An Investigation of Geographic Mapping Techniques for Internet Hosts"; all pages.

Gueye et al.; "Constraint-based geolocation of Internet hosts"; all pages.

Katz-Bassett et al.; "Towards IP Geolocation Using Delay and Topology Measurements"; all pages.

\* cited by examiner

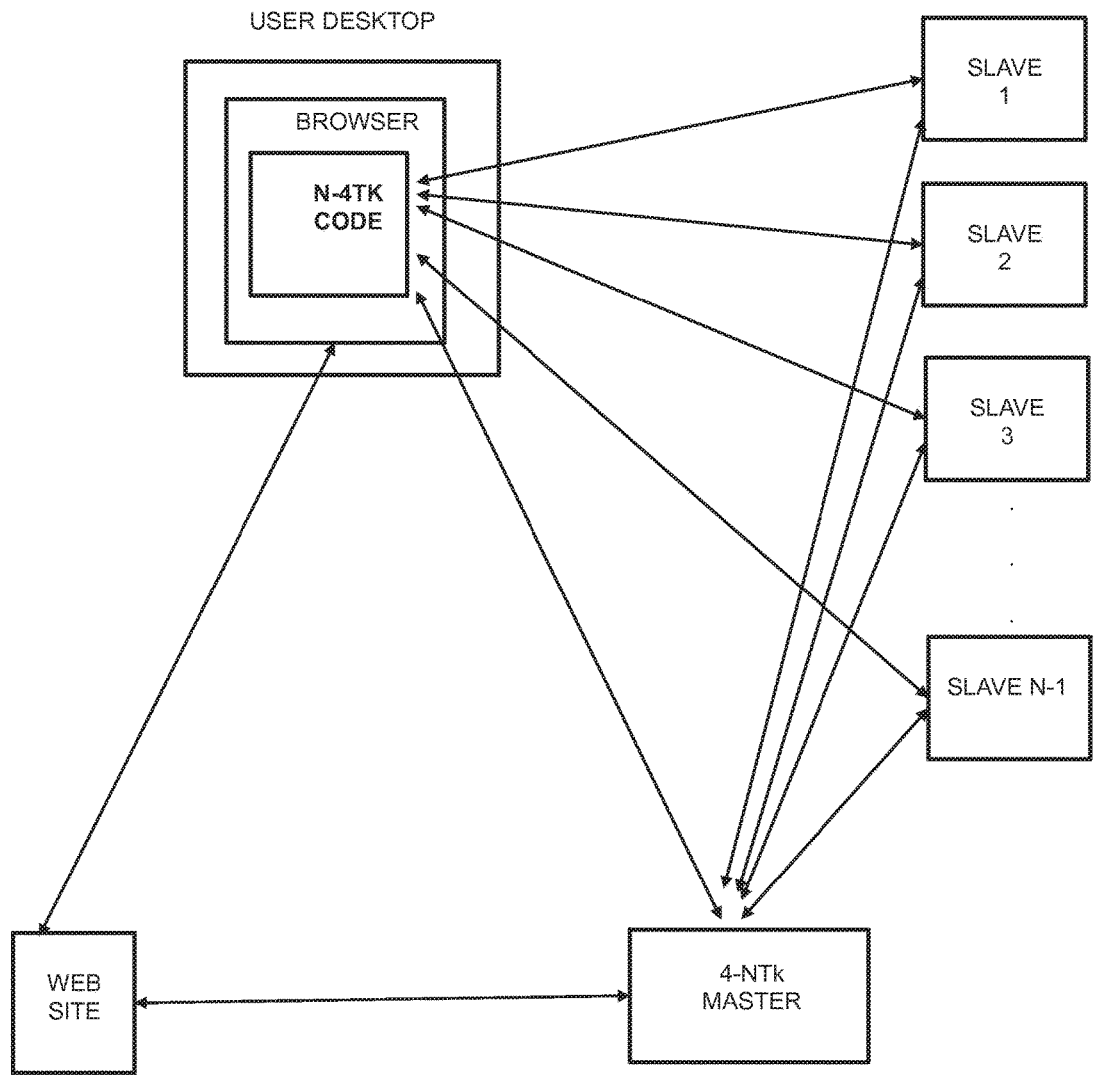
The components for the preferred embodiment

PROXIMITY IN PRIVACY AND SECURITY ENHANCED INTERNET GEOLOCATION

RELATED APPLICATIONS

This application is a continuation-in-part (CIP) of pending application Ser. No. 13/669,123 which claims priority on application Ser. No. 12/938,245 (now U.S. Pat. No. 8,341,236), which in turn claims priority based on Provisional U.S. Application Ser. No. 61/257,190, filed Nov. 2, 2009, and entitled "Project Hawk", the contents of which are incorporated herein in their entirety by reference.

TECHNICAL FIELD

This invention relates to security and privacy. Specifically it relates to the determination of the physical location of Internet users in a way that enhances security and privacy.

BACKGROUND OF THE INVENTION

Companies running web sites often have good reason to try and ascertain the physical location (or geolocation) of the user accessing their sites. Such geolocation information is useful for purposes such as marketing (e.g. to better target offers or advertisements) as well as fraud detection (e.g. if a user who normally checks their bank account from Wichita, Kans. is found to be logging in from East Europe, it might be reason enough for the bank to track the user's activities on the web site carefully).

When a user accesses a web site the only piece of information the web site knows is the user's origin IP address. To get from an IP address to a physical address requires the use of a technology known as IP geolocation. Ranges of IP addresses are assigned to Internet Service Providers who then make them available to end customers in different locales. For instance, the range 149.141.x.x might currently be in use by a particular ISP who is using that range in Alexandria, Va. IP geolocation technology essentially provides a reverse lookup on a database of a physical location given an IP address. The database is maintained by determining which ranges are in use in which locales and then updating the database as changes occur. IP geolocation has two significant shortcomings. First, the database underlying the reverse look-up is largely static and has to be manually updated which can result in errors. Perhaps more critical is the second shortcoming in that IP geolocation identifies a user very precisely and ties them to a particular PC. For most uses of IP geolocation it is usually sufficient for a web site to know that the user is currently located, for example, in Alexandria, Va. Knowing that they are precisely at IP address 141.149 0.1.1, and storing that information, is a needless violation of the user's privacy and in general storing personally identifiable data, especially when not required, is a needless increase in costs and potential liability to the web site.

An alternate method already prevalent in smartphones, and some computers, is to have a program on the phone to report the GPS coordinates of the user. Such GPS systems also provide more precise location data than is needed in most cases, and moreover cannot necessarily be used for fraud detection. This is because the GPS coordinates are self-reported by the software on the smartphone and consequently can fairly easily be thwarted by an attacker.

The innovation described herein provides a new method of IP geolocation that is both more secure (more difficult for an attacker to mislead) and provides more privacy to the user.

OBJECTIVES OF THE INVENTION

This invention has the following objectives:

Develop a new method of Internet geolocation that enhances security by making it harder for an attacker to misrepresent their location.

Develop a new method of Internet geolocation that enhances user privacy by allowing their general location to be determined without pinpointing their specific location or tying them to a particular PC.

Develop a new method to determine the proximity of two entities without any direct electronic communication between the two entities. For instance a user at a smartphone and an ATM machine. Or, a shopper checking out of a retail location.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

Our first innovation is to define a new N dimensional space called the N-4Tk space. This N-coordinate space is created by placing N servers at geographically dispersed locations across the Internet, and the coordinates for any given location on the Internet is a measure of the time it takes for data to travel between the location and the N servers. This is very roughly analogous to how the strength of a signal from a cell phone to multiple cell towers allows triangulation to locate the actual cell phone. However, that analogy does not quite work on the Internet as the time it takes for data to travel between any two points on the Internet depends on a variety of factors beyond physical distance, such as bandwidth, the time of day, what else a user might be downloading on their PC at that time, etc.

Our second innovation is to define a measure called 4Tk which is defined as the "Time Taken to Travel at that particular Time for a message of size k". By tying the time to travel to a specific time of day this measure adjusts for fluctuations in bandwidth depending on the time of day. By ensuring that the measurement is made for a message with a well-chosen size k, fluctuations due to the size of the message are accounted for.

Our third innovation is to designate one of the N servers as the Master, the rest as Slaves, and to calculate the 4Tk metric from an end user computer to the N servers, and to then aggregate all the 4Tk measurements at the Master in order to calculate the location of the user computer in the N-4Tk space.

Our fourth innovation is to measure the 4Tk distance from each Slave to the Master when the message travels through the user's computers.

Our fifth innovation is to compare the given 4Tk metric for a given user at a particular time with the historical data for that user to compute a risk score.

Our sixth innovation is to do a differential analysis on the 4Tk measurements to adjust for delays observed by all the servers, which could be caused by delays in the user's local PC or network (for e.g. if they are in parallel watching a streaming movie).

Our seventh innovation is to capture these measurements unobtrusively as the user types in data they would have anyway typed in such as a UserID or a CAPTCHA.

Our eighth innovation is to search the time between keystrokes for unusual patterns that could be indicative of proxy access at the user computer from a remote site.

Our ninth innovation is to iteratively "close-in" on the user by varying the particular servers used for the coordinate calculation. For instance, the first iteration might quickly determine that the user is in the United States, the second the particular metro area, the third the locale within the metro and so on.

Our tenth innovation is to allow the servers to periodically exchanges messages amongst each other in order to calculate measures that can be used to further refine the 4-NTk measurements for a given user.

Our eleventh innovation is to use a large number of 4Tk measurements across a large number of users to compute a real time effective bandwidth map of the Internet to be used for purposes such as intelligent placement of caches or routing.

In our prior disclosures (incorporated by reference), we showed how the geolocation of a user can be derived based on an analysis of traffic to and from their device to a series of external servers. In this application we observe that a similar technique can be extended to determine the proximity of two or more entities none of whose devices need have direct physical communication with each other.

BRIEF DESCRIPTION OF DRAWINGS

FIG. 1 describes the main components of the system.

PREFERRED EMBODIMENT(S) OF THE INVENTION

Our preferred embodiment consists of the following components as shown in Figure-I:
 The web site which is using the N-4Tk system which serves up the page containing the
 N-4Tk code to the user's browser or smartphone app.
 The user's PC that is being geolocated and on which the N-4Tk client code runs. Each users device that is being geolocated runs the N-4Tk client code. In addition an instance of the N-4Tk slave also runs on this device.
 The Master server which will compute the geolocation and report back to the web server.
 The N−1 geographically distributed Slaves in the system.

The process is initiated by the user browsing to a page at a web site that contains the N-4Tk client code. This client code will typically be embedded behind the scenes of a page into which the user types in a UserID, or perhaps a CAPTCHA. Several variations are possible here, but the general idea is to invoke the N-4TK code at some point where the user is typing in characters. For simplicity of exposition we will assume here that the user is typing in their UserID. As the user types in each character in the UserID, the character is padded with k−1 characters (say 0s) and sent to the web site, the Master, and the Slaves (the addresses of which are available to the client code). Subsequent characters are sent after receipt of an acknowledgement from the Master. Each character is time stamped at the last possible instant before being sent, and again time stamped at the first possible instant after being received. The difference between the two time stamps is a measure of the time taken for the message to travel from the user to the particular server (either Master or Slave). Each Slave forwards the message (with the time stamps) to the Master. The client sends a special "End of Transaction" character to indicate that the user has finished typing in the UserID.

The Master having received all the messages from the Slaves, as well as the messages sent to it directly, now has all the data needed to compute the N-4TK location of the User. If the Master has not encountered this UserID (from this Web Site) before it, it records it, else, it might look up the historical record of N-4Tk locations for this user. It then returns its estimate of the locale of the user to the web site, or a risk score indicating the variance from the previously measured locale.

To account for processing delays on the User's PC or local network, which would uniformly delay all the messages, the Master can be set up to take note of unusual delays effecting messages to all the servers and adjust the metric accordingly. The Master can also examine the delays between keystrokes to look for unusual patterns.

In all these calculations the Master computes the mean and standard deviation of the message time to each server for all the characters in the UserID. For instance, for a 15 character UserID, the Master in effect has a sample size of 15 measurements to each server. This allows it to get a better estimate than were it doing a single measurement.

An alternate metric that can be calculated is for the client code to request a message of size k from each Slave and then forward it to the Master. This measures the N-4Tk distance from each Slave to the Master via the User.

The Master can additionally require the Slaves to periodically directly send it messages so that it can compute a 4Tk direct distance from itself to the Slaves, and use that information to refine the metrics calculated above.

The accuracy of all of the above metrics improve as the number of Slaves increases, however, this brings additional costs and latency. One approach is to iteratively "close in" on the user by using a different set of Slaves in each iteration. For instance the system could first hone in on the country of origin, next the major metro area and then close in on the specific locale.

Finally, such a system that is making calculations for a large number of users (perhaps for multiple web sites) is in effect calculating a 'time of day' sensitive bandwidth map of the Internet as a side effect. This information can be used for intelligent placement of caches or routing of traffic.

We first consider the two entity proximity case. In our first example Alice is an ATM machine performing a transaction. During the course of this transaction she is performing key entry into the ATM machine. The back end system which is aware that Alice has a smartphone with an appropriate client installed, sends a confirmation message to Alice. Alice is asked to enter a few characters she reads off the ATM machine into the client. As Alice is performing data entry at two devices that are in close proximity it might appear that it is immediately possible to use the 4Tk statistics to determine that Alice and the ATM are in close proximity. However, this may not take into account that the ATM might have a high speed connection to the Internet, whereas Alice's smartphone might have a much slower speed 3G connection traveling along a different path.

The key innovation to solve this problem is to make both the ATM machine and the client on Alice's smartphone reciprocal slaves. i.e. when Alice types into the ATM machine some of the characters are making their way to her smartphone from the ATM, and conversely when she is typing into the smartphone, some of the characters are making their way into the ATM machine. Now these messages are travelling the same distance over equivalent networks in both directions, and it is consequently possible to get a far more accurate reading of the proximity of the ATM machine and Alice.

In our next example Alice and Bob are typing on respective smart devices. Perhaps Bob is a check out clerk and Alice is a shopper. An identical process plays out, except that in case different users are doing the typing.

It is possible for the two clients to at a synchronized point start sending padded characters to each other with or without any keystrokes actually being typed by either user. E.g. Alice and Bob press GO to start the process.

The same innovation can be used for more than two entities, perhaps taking advantage of the fact that if it is known that A is in proximity to B and B to C, then A and C are in proximity.

What is claimed is:

1. A method for determining the proximity of two entities with Internet connected devices, without using IP geolocation or GPS data, and by using the Time Taken to Travel at that particular Time for a message of size k (4Tk) statistics obtained by sending multiple characters from or through the Internet connected devices to multiple slaves by:
   a. Sending messages including multiple characters from or through the Internet connected devices to multiple slaves;
   b. Placing N geographically distributed servers across the Internet, including one on each of the Internet connected devices;
   c. Calculating a statistic on the mean time taken for messages of size k to travel from or through the Internet connected devices to the N servers at various times of day;
   d. Determining an average time taken for the data sent between the Internet connected devices, wherein the data sent between the Internet connected devices is of size k and each Internet connected device transmits and receives data;
   e. Identifying a particular one of the various times of day matching a time of transmission of the data sent between the Internet connected devices; and
   f. Determining the proximity of the two entities based on the statistic of the mean time, the average time taken for the data sent between the Internet connected devices, and the particular one of the various times of day.

2. A method according to claim 1 wherein the messages are formed by users typing characters including usernames or CAPTCHAs on the devices, with optional padding of each character.

3. A method according to claim 1 wherein the messages are automatically generated based on a signal from the user.

4. A method for determining the proximity of at least three entities with Internet connected devices in a pairwise fashion, without using IP geolocation or GPS data, and by using the Time Taken to Travel at that particular Time for a message of size k (4Tk) statistics obtained by sending multiple characters from or through the Internet connected devices to multiple slaves by:
   sending messages including multiple characters from or through pairs of the Internet connected devices to multiple slaves;
   placing N geographically distributed servers across the Internet, including one on each of the Internet connected devices;
   calculating a statistic on the mean time taken for messages of size k to travel from or through the Internet connected devices to the N servers at various times of day;
   determining an average time taken for the data sent between pairs of the Internet connected devices, wherein the data sent between the pairs of the Internet connected devices is of size k and each Internet connected device transmits and receives data;
   identifying a particular one of the various times of day matching a time of transmission of the data sent between the pairs of the Internet connected devices; and
   determining the proximity of the at least three entities based on the statistic of the mean time, the average time taken for the data sent between pairs of the Internet connected devices, and the particular one of the various times of day.

5. A method according to claim 4 wherein determining the proximity of the at least three entities utilizes optimizations including deriving from the knowledge that entity A is proximate to entity B, and that entity B is proximate to entity C, the information that entity A and entity C are also proximate without having to perform any pairwise calculation.

6. A method for determining the proximity of two entities with Internet connected devices, without using IP geolocation or GPS data, and by using the Time Taken to Travel at that particular Time for a message of size k (4Tk) statistics obtained by sending multiple characters from or through the Internet connected devices to multiple slaves by:
   detecting messages including multiple characters sent from or through the Internet connected devices to multiple slaves;
   placing N geographically distributed servers across the Internet, including one on each of the Internet connected devices;
   making the Internet connected devices reciprocal slaves with one another such that data sent between the Internet connected devices travels a same distance over equivalent networks in each direction;
   calculating a mean time value for messages of size k to travel from or through the Internet connected devices to the N servers at various times of day;
   determining an average time taken for the data sent between the Internet connected devices to travel the same distance over the equivalent networks, wherein the data sent between the Internet connected devices is of size k and each Internet connected device transmits and receives data;
   identifying a particular one of the various times of day matching a time of transmission of the data sent between the Internet connected devices; and
   determining a value of the same distance of the two Internet connected devices based on the average time, the particular one of the various times of day, and the mean time value, wherein the same distance is indicative of the proximity of the two entities.

7. A method according to claim 6 wherein, the data sent between the Internet connected devices is intermediately routed through at least one other of the N geographically distributed servers.

* * * * *